(12) United States Patent
Wallace et al.

(10) Patent No.: US 6,208,841 B1
(45) Date of Patent: Mar. 27, 2001

(54) ENVIRONMENTAL SIMULATOR FOR A WIRELESS COMMUNICATION DEVICE

(75) Inventors: Raymond C. Wallace; Paul J. Draxler, both of San Diego; Upkar Dhaliwal, Encinitas, all of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/305,256

(22) Filed: May 3, 1999

(51) Int. Cl.$^7$ ................................................. H04B 1/40
(52) U.S. Cl. ................................... 455/67.1; 455/67.4
(58) Field of Search ............................. 455/423, 424, 455/562, 67.1, 67.6, 67.4, 446

(56) References Cited

U.S. PATENT DOCUMENTS

| | | | |
|---|---|---|---|
| 3,761,825 | 9/1973 | Hill | 328/71 |
| 3,924,341 | 12/1975 | Edelsohn | 35/10.4 |
| 4,106,345 | 8/1978 | Saunders et al. | 73/432 |
| 4,201,987 | 5/1980 | Tricoles et al. | 343/703 |
| 4,546,358 | 10/1985 | Edlin et al. | 343/703 |
| 5,247,843 | 9/1993 | Bryan | 73/865.6 |
| 5,420,597 | 5/1995 | Duncan | 343/703 |
| 5,440,316 | 8/1995 | Podgorski et al. | 343/786 |
| 5,465,393 * | 11/1995 | Frostrom et al. | 455/54.1 |
| 5,475,374 * | 12/1995 | Moore | 340/825.22 |
| 5,794,128 * | 8/1998 | Brockel et al. | 455/67.1 |
| 5,809,108 * | 9/1998 | Thompson et al. | 379/15 |
| 5,862,455 * | 1/1999 | Martin et al. | 455/67.7 |
| 5,973,638 * | 10/1999 | Robbins et al. | 342/172 |
| 6,011,830 * | 1/2000 | Sasin et al. | 379/1 |
| 6,021,315 * | 2/2000 | Telewski | 455/67.1 |
| 6,073,026 * | 6/2000 | Kim et al. | 455/522 |

OTHER PUBLICATIONS

Howard Hilton, "Simulating Real–World Signal Environments for Receiver Testing", Hewlett–Packard, Lake Stevens Division, Everett, Washington.

(Jan. 1997) IEE Colloquium on "Design of Mobile Handset Antennas for Optimal Performance in the Presence of Biological Tissue", Ref. No. 1997/022.

* cited by examiner

Primary Examiner—Reinhard Eisenzopf
Assistant Examiner—Naghmeh Mehrpour
(74) Attorney, Agent, or Firm—Tom Streeter; Charles Brown; Phil Wadsworth

(57) ABSTRACT

An environmental simulator for use in the testing of wireless devices comprises a base station simulator, a signal manipulator, a switch and an antenna array. The environmental simulator is configured to couple wireless signals to and from a device under test in order to test the performance of the device over a variety of real world operating conditions.

11 Claims, 3 Drawing Sheets

ENVIRONMENTAL SIMULATOR FOR A WIRELESS COMMUNICATION DEVICE

BACKGROUND OF THE INVENTION

I. Field of the Invention

The invention relates generally to wireless communications. More particularly, the invention relates to environmental verification by test, demonstration or analysis of a wireless communication device.

II. Description of the Related Art

FIG. 1 is an exemplifying embodiment of a terrestrial wireless communication system 10. FIG. 1 shows the three remote units 12A, 12B and 12C and two base stations 14. In reality, typical wireless communication systems may have many more remotes units and base stations. In FIG. 1, the remote unit 12A is shown as a mobile telephone unit installed in a car. FIG. 1 also shows a portable computer remote unit 12B and the fixed location remote unit 12C such as might be found in a wireless local loop or meter reading system. In the most general embodiment, remote units may be any type of communication unit. For example, the remote units can be hand-held personal communication system units, portable data units such as a personal data assistant, or fixed location data units such as meter reading equipment. FIG. 1 shows a forward link signal 18 from the base stations 14 to the remote units 12 and a reverse link signal 20 from the remote units 12 to the base stations 14. Such systems typically offer voice and data services. Other modern communication systems operate over wireless satellite links rather than through terrestrial base stations.

In a code division multiple access (CDMA) system, remote units use a common frequency band for communication with all base stations in the system. Use of a common frequency band adds flexibility and provides many advantages to the system. For example, the use of a common frequency band enables a remote unit to simultaneously receive communications from more than one base station as well as transmit a signal for reception by more than one base station. The remote unit can discriminate and separately receive the simultaneously received signals from the various base stations through the use of the spread spectrum CDMA waveform properties. Likewise, the base station can discriminate and separately receive signals from a plurality of remote units. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein. An industry standard for a wireless system using code division multiple access (CDMA) is set forth in the TIA/EIA Interim Standard entitled "Mobile Station Base Station Compatibility Standard for Dual-Mode Wideband Spread Spectrum Cellular System", TIA/EIA/IS-95, and its progeny (collectively referred to here in as IS-95), the contents of which are also incorporated herein by reference.

CDMA communication techniques offer many advantages over narrow band modulation techniques. In particular, the terrestrial channel poses special problems due to the generation of multipath signals which can be overcome through the use of CDMA techniques. For example, at the base station receiver, separate multipath signals from a common remote unit signal can be discriminated and separately received using similar CDMA techniques as those used to discriminate between signals from the various remote units.

In the terrestrial channel, multipath signals are created by reflection of signals from obstacles in the environment, such as trees, buildings, cars and people. In general, the terrestrial channel is a time varying multipath channel due to the relative motion of the structures that create the multipath. For example, if an ideal impulse is transmitted over a multipath channel, a stream of pulses is received. In a time varying multipath channel, the received stream of pulses changes in time location, amplitude and phase as a function of the time at which the ideal impulse is transmitted.

Because the response of the remote unit to multipath is a significant factor in determining the overall performance of the remote unit, it is important to test this response—both statistically and on a unit-by-unit basis. One way multipath testing has been executed in the past is by creation of artificial multipath signals. See, for example, U.S. Pat. No. 3,761,825, entitled "MULTIPATH SIMULATOR FOR MODULATED R.F. CARRIER SIGNALS." However, such techniques develop the multipath signals on a wired connection which is designed to be directly coupled to the device under test. Such direct connections bypass the antenna structure and, therefore, do not provide a complete assessment of the response of the device under test to wireless multipath received through the antenna.

Another way in which such tests have been performed in the past is to place the remote unit in a test vehicle and collect test data as the vehicle moves around within a real world environment. The disadvantage of such tests is that they are not highly repeatable and a significant amount of data must be collected on each device under test to be statistically significant. For example, on one test run, the device under test may be subjected to extreme multipath if it comes to rest beside a large semi-truck at a stop light. On another run, traffic may be very light, thus, generating less multipath. The data collected from each of these runs might be vastly different even though the two devices have the same performance because the stimulating signal is not deterministic or controllable.

In addition, the real world environment imposes other significant effects aside from multipath. For example, with hand-held units, the hand and head of the user affect the far field antenna characteristics. Extensive work has been done to characterize these effects. See, for example, Technical Papers from the Colloquium on DESIGN OF MOBILE HANDSET ANTENNAS FOR OPTIMAL PERFORMANCE IN THE PRESENCE OF BIOLOGICAL TISSUE at Savory Place on Monday Jan. 20, 1997, organized by Professional Group E11 (Antennas and Propagation) and co-sponsored by Professional Groups E8 (Radiocommunication Systems) and S9 (Biomedical Engineering) of the Institute of Electrical Engineers, Savory Place, London. In this way, if real-world tests are run, the results may depend upon the physical characteristics of the technician executing the tests, thereby further decoupling the results of the test from the actual performance of the device under test.

In order to overcome the problems with real world testing, simulated environments have been developed to test the performance of wireless devices. See, for example, U.S. Pat. No. 4,106,345 entitled "SIMULATION FACILITIES FOR DYNAMICALLY TESTING GUIDANCE SYSTEMS WHICH USE RADIOMETRIC FREQUENCIES" However, such environments do not perform the functions necessary to test a wireless remote unit whose performance is highly dependent upon the statistical nature of the channel environment. Thus, there has been a need in the art for a means for and method of simulating an environment for a wireless communication device which is easy to control and provides repeatable results.

SUMMARY OF THE INVENTION

The invention comprises an environmental simulator for use in the testing of wireless devices. The environmental simulator comprises a base station simulator configured to create forward link signaling intended for a wireless remote unit. A signal manipulator is coupled to the base station simulator and imposes a measure of manipulation of the forward link signaling, thus producing one or more manipulated forward link signals. A switch which has several input ports is coupled to the manipulated forward link signals. The switch is configured to programmably couple one or more of its input ports to one or more of its output ports. The environmental simulator also incorporates an antenna array made up of a plurality of antennas. The antenna array is coupled to the series of output ports of the switch so that it couples the manipulated wireless signals to a wireless remote unit under test. A controller is coupled to the signal manipulator and the switch. The controller controls the measure of manipulation imposed by the signal manipulator and the programmable coupling of the switch. In this way, the performance of the remote unit under test can be determined including aspects of the performance associated with the antenna of the device under test. For example, the controller can be configured to command the signal manipulator to generate time offset versions of the forward link signaling and to command the switch to couple the versions to a first set of the antennas within the array of antennas in order to simulate a multipath environment in which the multipath signals arrive from several angles.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE INVENTION

Figure 2:
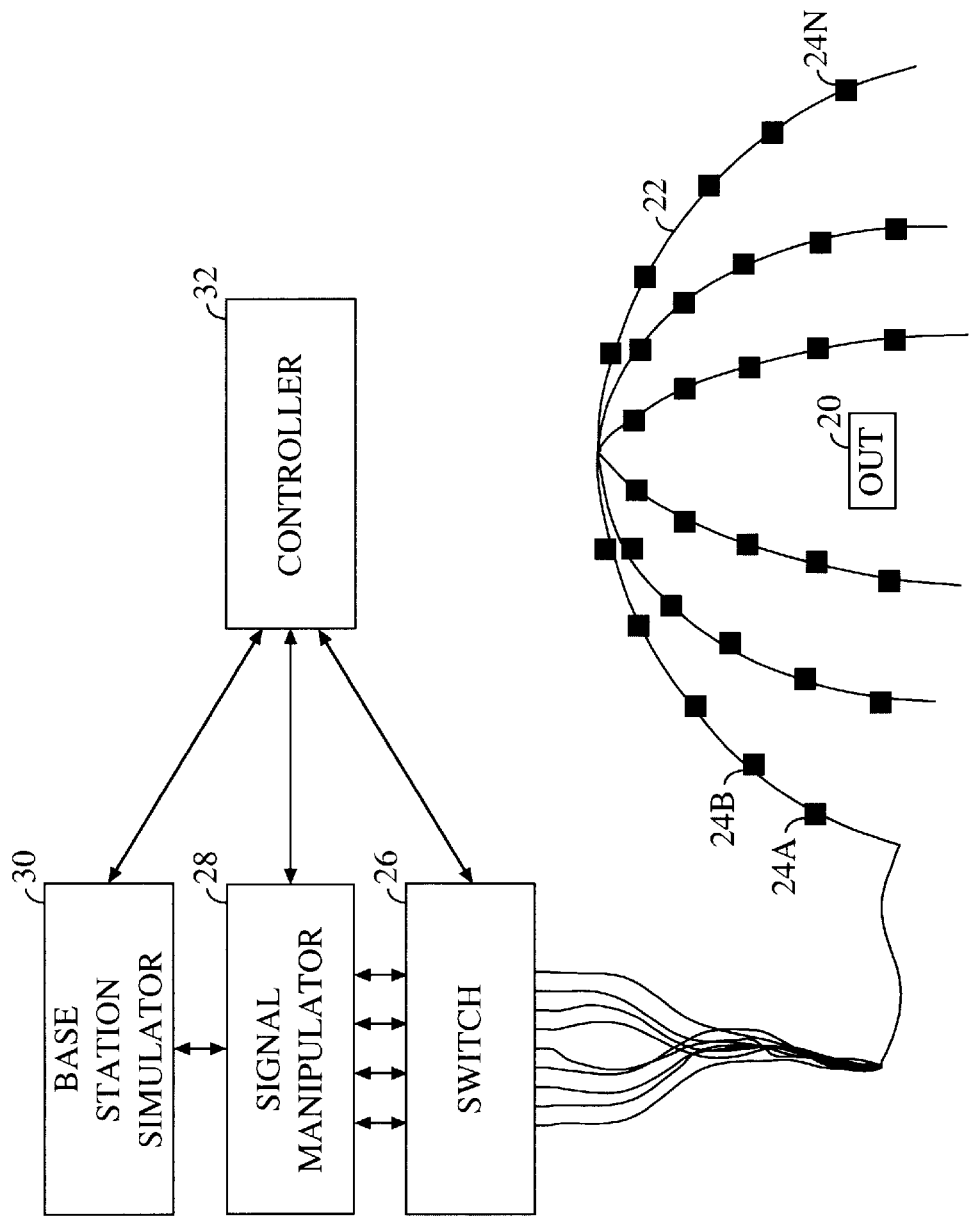
FIG. 2 is a block diagram showing one embodiment of the invention.

FIG. 2 is a block diagram showing one embodiment of the invention. A device under test 20 is placed within an antenna array 22. The device can be any manner of wireless remote unit such as, but not limited to, a hand-held or vehicle-based telephone, a portable data unit such as a personal data assistant, a fixed location data unit such as meter reading equipment, a wireless local loop unit or a personal computer with wireless capabilities. The antenna array 22 is comprised of a series of antennas 24A–24N. The antennas 24A–24N are located at sufficient distance from the device under test 20 that they are able to detect the far field effects for the device under test 20. The antennas 24A–24N can be dipole antennas, patch antennas, directional antennas or any other manner of antenna capable of operation at the frequencies at issue.

In the embodiment shown, the antenna array 22 forms a hemispherical dome over the device under test 20. However, the antenna array 22 can take on a variety of forms which allow the spatial characteristics of the device under test 20 to be detected. Other embodiments are also contemplated. For example, in one embodiment, a small number of movable antennas are included in the system. These antennas can be moved in order to test various spatial characteristics of the device under test. In another embodiment, a fewer number of antennas are included and the device under test is attached to a mount which can rotate and re-orient the device so that various spatial characteristics of the device can be determined.

In one embodiment, each antenna 24A–24N is separately coupled to an output port of a programmable switch 26 such that each antenna 24A–24N can be separately stimulated. The switch 26 receives one or more signals from a signal manipulator 28. The switch 26 can couple the input signals to one or more of the output ports in order to stimulate one or more antennas. For example, a single input signal can be coupled to a first set of one or more output ports. In addition, another input signal can be coupled to some of the first set of one or more output ports and also to other output ports. These connections within the switch 26 are controlled by a controller 32. Switches which perform these types of functions are well known in the art. For example, the Wideband Switch Matrix VXI Platform, HPE6490 Senes is marketed by Hewlett Packard of Palo Alto, Calif., USA.

The signal manipulator 28 receives forward link signaling from a base station simulator 30. The signal manipulator 28 imposes a measure of manipulation of the forward link signaling under the control of the controller 32. For example, the signal manipulator 28 can control the absolute value and statistical nature of the amplitude and phase of the forward link signaling and add noise in a statistical nature to the system. Such noise can emulate other users in the system, thermal noise, interference from other systems as well as other types of noise. In addition, the signal manipulator 28 creates narrow band jamming signals which may or may not contain modulation, may be stationary or frequency hopped. In some cases, the added signals are output from a common port with the forward link signaling. In other cases, the added signals are output from one port and the forward link signaling is output by another so that they can be individually coupled to the switch 26.

One important test which can be performed on the device under test 20 is its response to a multipath environment. In order to create multipath signals, the signal manipulator 28 creates a series of time offset versions of the forward link signaling. The signal versions can vary in amplitude, phase, delay angle of elevation and angle of azimuth. For example, in one embodiment, the signal manipulator 28 comprises the functionality shown in the above referenced U.S Pat. No. 3,761,825. By directing the time offset versions to one or more antennas 24 within the array 22, a repeatable multipath environment can be developed. In one embodiment, the signal manipulator 28 is capable of producing about four to six different multipath signals which allows the simulation of the most likely worst case, real world environment.

The implementation of the signal manipulator 28 is well known in the art and can be implemented using a variety of software and hardware components. For example, the signal manipulator 28 can be a RF Channel Emulator TA4500 marketed by Telecom Analysis Systems, Inc; of Eatontown, N.J., USA.

The base station simulator 30 generates the forward link signaling. In one embodiment, the base station simulator 30 generates wireless signals, e.g. CDMA according to IS-95. For example, the base station simulator 30 can be a CMD80 marketed by Tektronics, Inc. of Wilsonville, Oreg., USA or a HP8924C manufactured by Hewlett-Packard, Inc. of Palo Alto, Calif., USA.

In one embodiment, the controller 32 commands the base station simulator 30 to enter a data loop back mode. In data loop back mode, the base station simulator 30 commands the device under test to enter into a data reflecting mode in which the device under test 20 repeats back the data transmitted by the base station simulator 30. In the preferred embodiment, a reverse link path from the device under test 20 through the antenna array 22, the switch 26 and the signal manipulator 28 to the base station simulator 30 is available so that the base station simulator 30 can monitor the reverse link signaling received from the device under test 20. The base station simulator 30 compares the reflected data with the transmitted data to determine a performance indication of the link. For example, the base station simulator 30 can develop a symbol error rate (SER), frame error rate (FER) or bit error rate (BER) of the reflected data. Data loop back mode can be used to test the response of the device under test 20 to a variety of code and frequency channels, power levels and data rates. The use of data loop back mode to test the performance of a CDMA remote unit is well known in the art and such capability is provided on the two exemplifying produces noted above.

Additional tests can also be performed on the device under test 20 using the diagram shown in FIG. 2. For example, an artificial head, hand or body can be located within the antenna array 22 such as to simulate the effects of a human on the performance of the device. Alternatively, actual human operators could be placed within the array 22.

Figure 3:
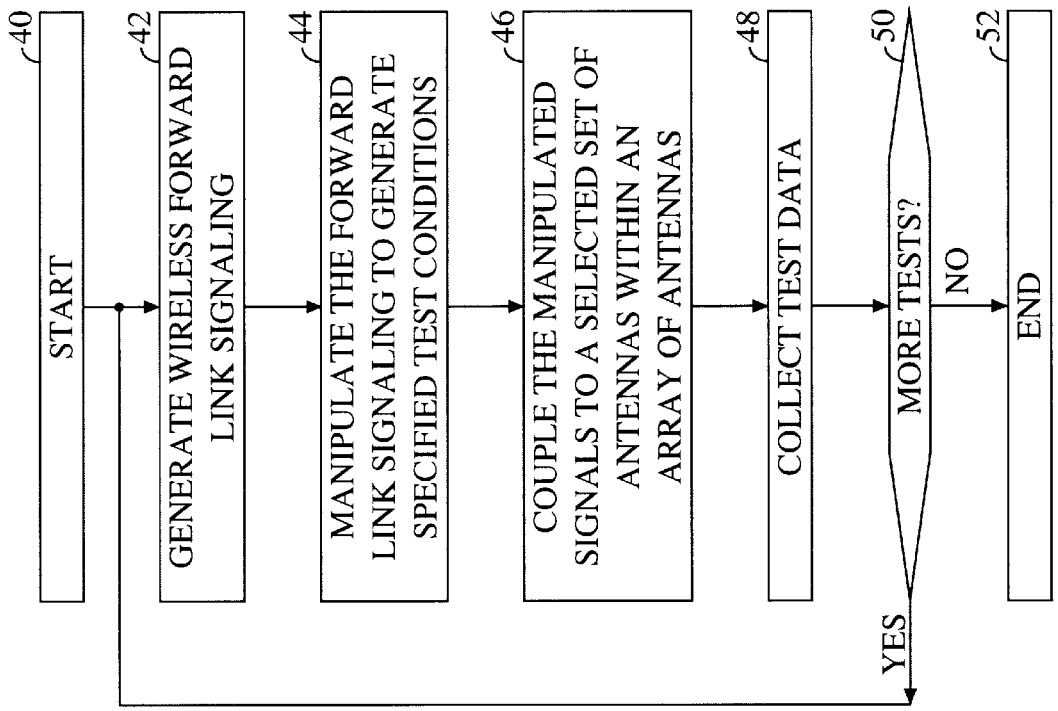
FIG. 3 is a flow chart illustrating exemplifying operation according to the invention.

The operation of the invention will be more clearly understood with reference to flow chart of FIG. 3. Flow begins in start block 40. In block 42, CDMA forward link signaling is generated. For example, in one embodiment, forward link data loop back signaling is generated. The channel, power level and data rate of the signal can be selected or varied throughout the test. In block 44, the forward link signaling is manipulated in order to generate specified test conditions. For example, noise signals, interference signals, multipath signals and jammers can be generated. In block 46, the manipulated signals are coupled to a set of antennas within an array of antennas. In block 48, test data is collected. The test data can be used to assess the performance characteristics of the device under test. For example, in one embodiment, the device under test reflects data received within the forward link signaling. An error rate is calculated and used to determine the performance of the device under test. Block 50 determines whether more tests are to be run. For example, the signal manipulation conditions might be executed again through a second set of antennas in order to determine the spatial characteristics of the device under test.

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed is:

1. An environmental simulator for use in the testing of wireless devices, comprising:

a base station simulator configured to create forward link signaling intended for a wireless remote unit;

a signal manipulator coupled to said base station simulator and configured to impose a measure of manipulation of said forward link signaling in order to produce one or more manipulated forward link signals;

a switch having a plurality of input ports coupled to said one or more manipulated forward link signals and having a series of output ports, wherein said switch is configured to programmably couple one or more input port to one or more output port;

an antenna array comprising a plurality of antennas, each antenna coupled to at least one of said series of output ports, said antenna array configured to couple wireless signals to a wireless remote unit; and a controller coupled to said signal manipulator and said switch, said controller controlling said measure of manipulation imposed by said signal manipulator and said programmable coupling of said switch.

2. The environmental simulator of claim 1, further comprising an element to simulate the effects of a human located within said antenna array.

3. The environmental simulator of claim 1, wherein said antenna array forms a hemispherical dome.

4. The environmental simulator of claim 1, wherein said controller is configured to command said signal manipulator to generate time offset versions of said forward link signaling and to command said switch to couple said versions to a first set of said antennas within said array of antennas in order to simulate a multipath environment.

5. The environmental simulator of claim 1, wherein said controller is configured to command said signal manipulator to generate interference signals and to command said switch to couple said interference signals to a first set of said antennas within said array of antennas.

6. The environmental simulator of claim 5, wherein said interference signals simulate other forward link signaling.

7. The environmental simulator of claim 5, wherein said interference signals simulate jammers.

8. The environmental simulator of claim 1, wherein said base station simulator is further configured to receive reverse link signaling from said wireless remote unit and to determine a level of performance based upon said reverse link signaling.

9. The environmental simulator of claim 8, wherein said wireless remote unit is a CDMA unit capable of demodulating multipath signals.

10. The environmental simulator of claim 8, wherein said wireless remote unit reflects data from said forward link signaling on said reverse link signaling.

11. A method of wireless remote unit testing, comprising the steps of:

generatrng wireless for ward link signaling;

manipulating said forward link signal link to generate specified test conditions thereby creating one or manipulated signals;

coupling said one or more manipulated signals to a set of selected antennas within an array of antennas; and collecting a set of test data from a wireless device under test wherein said device under test is wirelessly coupled to said antenna array and is capable of separately receiving multipath signals.

* * * * *

UNITED STATES PATENT AND TRADEMARK OFFICE
CERTIFICATE OF CORRECTION

Figure 1:
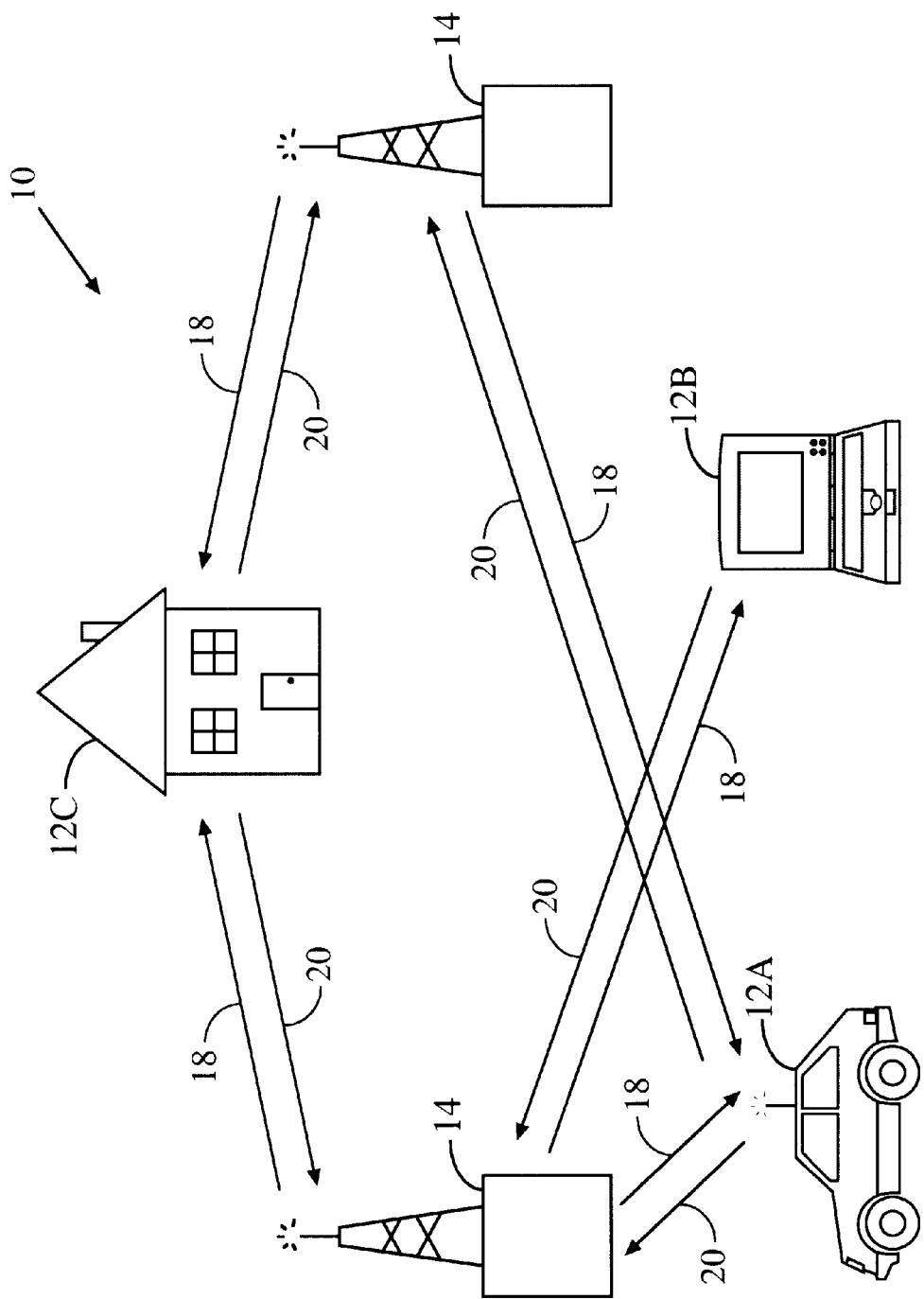
FIG. 1 is a block diagram showing a typical modern wireless communication system.

PATENT NO.    : 6,208,841 B1
DATED         : March 27, 2001
INVENTOR(S)   : Tatsumasa Yoshida It is certified that error appears in the above-identified patent and that said Letters Patent is hereby corrected as shown below:

Column 4,
Line 27, change "Fig. 1 is a basic block diagram" to -- Figs. 1A and 1B are basic block diagrams --;
Line 31, change "stage." to -- stage, and wherein --;
Line 35, change "example" to -- exemplary --.

Column 21,
Line 46, before "said" insert -- wherein --;
Line 47, after "level" delete "portion";
Line 48, change "generating" to -- generates --;
Line 51, change "outputting" to -- outputs --;

Column 22,
Lines 1 and 4, before "half-wave" insert -- a first --; and after "signal" insert -- being --;
Line 15, change "1" to -- 3 --;
Line 19 change "the other" to -- another --;
Line 20, change "the" to -- a --;
Line 21, change "stage" to -- circuit --;
Line 23, delete "separate"; and after "first" insert -- variable resistor --
Line 24, change "second variable resistor;" to -- a second variable resistor separate from said first variable resistor, --; and
Line 26, change "level;" to -- level, --;

Column 23,
Line 26, change "sign" to -- polarity --;
Line 27, after "determining" delete "sign of";
Line 35, change "sign" to -- polarity --;
Line 37, after "second" change "sign" to -- polarity --; and after "determining" delete "sign of";
Line 42, after "third" change "sign" to -- polarity --; and change "sign of" to -- a --;
Line 61, change "sign" to -- polarity --;
Line 62, after "determining" delete "sign of";
Line 64, after "first" change "sign" to -- polarity --;

UNITED STATES PATENT AND TRADEMARK OFFICE
CERTIFICATE OF CORRECTION

PATENT NO.      : 6,208,841 B1
DATED           : March 27, 2001
INVENTOR(S)     : Tatsumasa Yoshida It is certified that error appears in the above-identified patent and that said Letters Patent is hereby corrected as shown below:

Column 24,
Line 2, after "first" change "sign" to -- polarity --;
Line 5, after "second" change "sign" to -- polarity --;
Lines 5 and 6, after "determining" change "sign of" to -- a --;
Line 10, after "third" change "sign" to -- polarity --;
Line 11, after "for determining" change "sign of" to -- a --;
Line 29, before "voltage" insert -- a --;

Column 25,
Line 37, change "value" to -- value, --.

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,208,841 B1
DATED         : March 27, 2001
INVENTOR(S)   : Raymond C. Wallace et al.

It is certified that error appears in the above-identified patent and that said Letters Patent is hereby corrected as shown below:

This certificate supersedes Certificate of Correction issued October 22, 2002, the number was erroneously mentioned and should be vacated since no Certificate of Correction was granted.

Signed and Sealed this

First Day of July, 2003

JAMES E. ROGAN
*Director of the United States Patent and Trademark Office*